United States Patent
Inenaga et al.

(10) Patent No.: US 9,213,194 B2
(45) Date of Patent: Dec. 15, 2015

(54) SURFACE PROTECTION PANEL AND LIQUID CRYSTAL IMAGE DISPLAY DEVICE

(75) Inventors: Makoto Inenaga, Nagahama (JP); Masahiko Kawano, Nagahama (JP)

(73) Assignee: MITSUBISHI PLASTICS, INC., Tokyo (JP)

( * ) Notice: Subject to any disclaimer, the term of this patent is extended or adjusted under 35 U.S.C. 154(b) by 373 days.

(21) Appl. No.: 13/515,138

(22) PCT Filed: Dec. 8, 2010

(86) PCT No.: PCT/JP2010/072011
§ 371 (c)(1),
(2), (4) Date: Jun. 11, 2012

(87) PCT Pub. No.: WO2011/071075
PCT Pub. Date: Jun. 16, 2011

(65) Prior Publication Data
US 2012/0287388 A1 Nov. 15, 2012

(30) Foreign Application Priority Data
Dec. 10, 2009 (JP) ................................ 2009-280160

(51) Int. Cl.
*G02F 1/1333* (2006.01)
*B32B 27/00* (2006.01)
(Continued)

(52) U.S. Cl.
CPC .............. *G02F 1/1333* (2013.01); *B32B 27/00* (2013.01); *G02F 1/133308* (2013.01);
(Continued)

(58) Field of Classification Search
CPC ................................ G06F 3/045; G06F 3/041
USPC .................. 349/104–105, 137–138, 117–122
See application file for complete search history.

(56) References Cited

U.S. PATENT DOCUMENTS 7,306,852 B2 * 12/2007 Komada ........................ 428/446
7,341,766 B2 * 3/2008 Kishimoto et al. ............ 428/1.6
(Continued)

FOREIGN PATENT DOCUMENTS

| JP | 60138514 A * | 7/1985 | .............. G02F 1/133 |
| JP | 2003 145658 | 5/2003 | |

(Continued)

OTHER PUBLICATIONS

International Search Report Issued Jan. 18, 2011 in PCT/JP10/72011 Filed Dec. 8, 2010.
(Continued)

*Primary Examiner* — Hoan C Nguyen
(74) *Attorney, Agent, or Firm* — Oblon, McClelland, Maier & Neustadt, L.L.P

(57) ABSTRACT

A novel surface protection panel is provided, with no rainbow colors appearing within the display screen or shading occurring, even when the display screen is viewed through sunglasses equipped with polarization lenses. Proposed is a surface protection panel disposed on the outer side of a liquid crystal display panel, that is to say, on the visible side of the liquid crystal display panel in a liquid crystal image display device equipped with a liquid crystal display panel. The surface protection panel has a constitution which a gas barrier transparent resin film having a gas barrier layer is layered on one side or on each side of a transparent synthetic resin plate, and the surface protection panel has a property which both the transparent synthetic resin plate and the gas barrier transparent resin film are non-stretched substantially, non-oriented or uniaxially oriented.

20 Claims, 1 Drawing Sheet

(51) Int. Cl.
G02B 1/10 (2015.01)
G02B 1/11 (2015.01)

(52) U.S. Cl.
CPC .................. *G02B 1/105* (2013.01); *G02B 1/11* (2013.01); *G02F 2001/133331* (2013.01); *G02F 2001/133342* (2013.01); *Y10T 428/266* (2015.01); *Y10T 428/31504* (2015.04); *Y10T 428/31507* (2015.04); *Y10T 428/31739* (2015.04); *Y10T 428/31855* (2015.04); *Y10T 428/31931* (2015.04); *Y10T 428/31935* (2015.04); *Y10T 428/31938* (2015.04); *Y10T 428/31971* (2015.04)

(56) References Cited

U.S. PATENT DOCUMENTS

| | | | |
|---|---|---|---|
| 2006/0142412 A1* | 6/2006 | Yamaoka et al. | 523/111 |
| 2008/0220184 A1* | 9/2008 | Sakurai et al. | 428/1.51 |
| 2009/0072230 A1* | 3/2009 | Ito et al. | 257/40 |
| 2009/0072735 A1* | 3/2009 | Tsukahara et al. | 313/512 |
| 2009/0181244 A1* | 7/2009 | Fukugami et al. | 428/336 |
| 2010/0060833 A1 | 3/2010 | Ochiai et al. | |
| 2011/0195240 A1* | 8/2011 | Inenaga | 428/215 |

FOREIGN PATENT DOCUMENTS

| | | |
|---|---|---|
| JP | 2007 152847 | 6/2007 |
| JP | 2008 23892 | 2/2008 |
| JP | 2008 241727 | 10/2008 |
| JP | 2008 250286 | 10/2008 |
| JP | 2010 85978 | 4/2010 |

OTHER PUBLICATIONS

U.S. Appl. No. 13/505,972, filed Jun. 8, 2012, Niimi, et al.

* cited by examiner

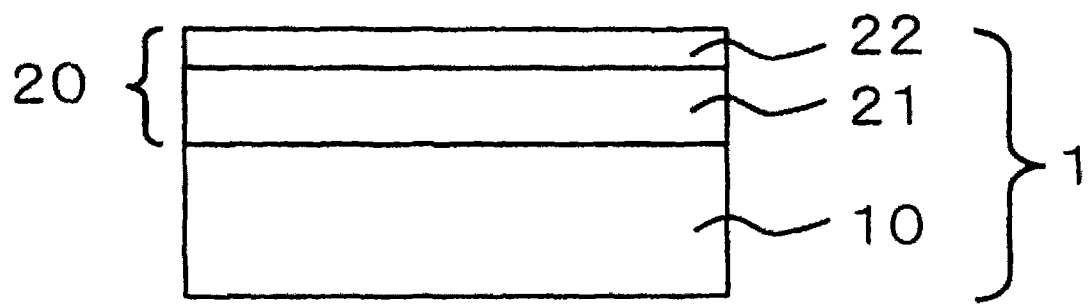

SURFACE PROTECTION PANEL AND LIQUID CRYSTAL IMAGE DISPLAY DEVICE

TECHNICAL FIELD

The present invention relates to a surface protection panel to be layered on the outer side of a liquid crystal display panel, in other words, on the visible side of a liquid crystal display panel, in a liquid crystal image display device equipped with a liquid crystal display panel, such as a mobile phone, a mobile gaming machine, a mobile personal computer, a mobile terminal, a television, or a touch panel.

TECHNICAL BACKGROUND

In prior art, in a liquid crystal image display device equipped with a liquid crystal display panel, a glass plate serving as a surface protection panel is disposed on the visible side of the liquid crystal display panel for the purpose of protecting the surface of the liquid crystal display panel. However, in recent years, with the requests for weight reduction and improvement of shock resistance for these, transparent synthetic resin plates such as acrylic plates and polycarbonate plates are being used as alternative materials to glass substrates.

In addition, in this type of liquid crystal image display devices, layering has been carried out in prior art by providing a gap between the liquid crystal display panel and the surface protection panel, thereby elevating cushioning characteristics and preventing scratching and cracking of the liquid crystal display panels. However, not only there is the problem that reflections arise at the interface between the surface protection panel and the gap, decreasing image visibility and rendering an image difficult to see, particularly outdoors, but there is also the problem that providing a gap becomes an obstacle to thinning. Therefore, directly layering the liquid crystal display panel and the surface protection panel through a transparent pressure-sensitive adhesive or sheet has been proposed with the objective of achieving both thinning and visibility improvement. For instance, in Patent Reference 1 or the like, it is disclosed of a surface protection panel having a constitution which a transparent gas barrier film comprising a metal oxide film formed on a base film such as a biaxially-stretched polyethylene terephthalate (PET) film or a biaxially-stretched polypropylene (OPP) film is layered on each side of a transparent synthetic resin plate and a base film.

PRIOR ART REFERENCES

Patent References

[Patent Reference 1] Japanese Patent Application Laid-open No. 2003-145658

SUMMARY OF THE INVENTION

Problems to be Solved by the Invention

In recent years, as miniaturization and portabilization of image display devices proceed, usage of image display devices has diversified, giving rise to new problems that could not be envisioned in prior art usages. For instance, regarding mobile type touch panels, gaming machines, navigation function-equipped liquid crystal image display devices, and the like, the frequency of outdoor use is on the rise, which is being accompanied by increasing occasions for using the devices while the user is wearing sunglasses. Problems have been appearing newly, that when the display screen is viewed through sunglasses, in particular sunglasses equipped with polarization lenses, as a result of rainbow colors appearing within the display screen, shading occurs depending on the viewing angle, which decreases visibility considerably.

Thus, the present invention is to provide a novel image display device in which no rainbow colors appear within the display screen or no shading occurs even when the display screen is viewed through sunglasses equipped with polarization lenses, and a novel surface protection panel used therefor.

Means for Solving the Problems

The present invention proposes a surface protection panel disposed on the outer side of a liquid crystal display panel, that is to say, on the visible side of the liquid crystal display panel in a liquid crystal image display device equipped with a liquid crystal display panel, the surface protection panel has a constitution which a gas barrier transparent resin film having a gas barrier layer is layered on one side or on each side of a transparent synthetic resin plate, and the surface protection panel has a property that both the transparent synthetic resin plate and the gas barrier transparent resin film are not stretched substantially.

Here, "not stretched substantially" means not stretched intentionally in the manufacturing process of each.

The present invention additionally proposes a surface protection panel disposed on the outer side of a liquid crystal display panel, that is to say, on the visible side of the liquid crystal display panel in a liquid crystal image display device equipped with a liquid crystal display panel, the surface protection panel has a constitution which a gas barrier transparent resin film having a gas barrier layer is layered on one side or on each side of a transparent synthetic resin plate, and the surface protection panel has a property that the transparent synthetic resin plate and the gas barrier transparent resin film are non-oriented or uniaxially oriented.

Here, "non-oriented" means no orientation treatment such as stretching treatment has been carried out intentionally in the manufacturing process of each. In addition, "uniaxially oriented" is a meaning that includes cases having an orientation direction in only one direction owing to an intentional orientation treatment such as uniaxial stretching, and cases having an orientation direction in only one direction although no intentional orientation treatment has been carried out.

In prior art, gas barrier layered films comprising a gas barrier layer layered on a biaxially-stretched film such as from PET or PEN have been used frequently as surface protection panels disposed on the outer side of a liquid crystal display panel, that is to say, on the visible side of the liquid crystal display panel. By using an unstretched film, a non-oriented film or an uniaxially oriented film alternatively to such biaxially-stretched films, the present inventors succeeded in allowing no rainbow colors to appear within the display screen and no shading to occur even if the display screen is viewed through sunglasses equipped with polarization lenses.

BRIEF DESCRIPTION OF THE DRAWINGS

FIG. 1 is a cross-sectional view of one embodiment of the present invention. In FIG. 1, 1 indicates a surface protection panel, 10 indicates a transparent synthetic resin plate, 20 indicates a gas barrier transparent resin film, 21 indicates a base film, and 22 indicates a gas barrier layer.

MODES FOR CARRYING OUT THE INVENTION

Examples of embodiment of the present invention will be described hereinafter. However, the scope of the present invention is not limited to the embodiments descried below.

The Present Surface Protection Panel

The surface protection panel according to the present embodiment (abbreviated as "the present surface protection panel") is a surface protection panel disposed on the outer side of a liquid crystal display panel, that is to say, on the visible side in a liquid crystal image display device equipped with a liquid crystal display panel, having a constitution which a gas barrier transparent resin film having a gas barrier layer is layered on one side or on each side of a transparent synthetic resin plate.

The "visible side" means the viewer's side when a user views the liquid crystal image of a liquid crystal image display device.

Transparent Synthetic Resin Plate

A transparent synthetic resin plate is a member filling mainly the role of protection panel for damage prevention of a liquid crystal image display device, which material is not limited in particular. For instance, one species or two or more species of resin chosen from the group comprising polycarbonate series resins, PMMA (poly methyl methacrylate) series resins, alicyclic polyolefin series resins, styrene series resins, polyvinyl chloride series resins, phenol series resins, melamine series resins and epoxy series resins can be indicated as examples. Among them, polycarbonate resins are desirable from the points of view of transparency, heat resistance and shock resistance.

It is important for the transparent synthetic resin plate of the present surface protection panel to not have been stretched substantially, to be non-oriented, or to be uniaxially oriented. In other words, it is important that the transparent synthetic resin plate is not biaxially oriented, and has a smaller optical anisotropy than a same-composition transparent synthetic resin plate that has been biaxially stretched.

Thus, a desirable transparent synthetic resin plate is for instance one that has been formed by casting a raw material resin in solution state or monomer state by a solution casting method and then either not stretching or uniaxially stretching. In addition, forming a film of transparent resin plate with small optical anisotropy is also possible by pressing with metal belts, elastic rolls having a metal thin layer, or the like, in melt-extrusion molding.

For instance, when a sheet body (including plate body) is molded by melt-extrusion molding, sometimes it becomes oriented uniaxially even if no stretching treatment has been carried out.

When the transparent synthetic resin plate is uniaxially oriented, disposing the present surface protection panel so as to align the direction of the orientation axis thereof with the direction of the orientation axis of the polarizer allows the appearance of rainbow colors within the display screen to be eliminated and occurrence of shading depending on the viewing angle to be prevented.

For the retardation value of the transparent synthetic resin plate, 50 nm or less is desirable, and in particular 25 nm or less is more desirable. If the retardation value is adjusted to this range to make the optical anisotropy small, even when the transparent synthetic resin plate is uniaxially oriented, disposing [the plate] in any orientation allows the appearance of rainbow colors within the display screen to be eliminated and occurrence of shading depending on the viewing angle to be prevented, with no need to align the direction of the orientation axis of the transparent synthetic resin plate with the direction of the orientation axis of the polarizer as described above.

The thickness of the transparent synthetic resin plate is not limited in particular if the thickness is such that the role of damage prevention of the image display device may be filled. In general 0.3 mm to 5 mm and in particular 0.5 mm to 3 mm are desirable.

Gas Barrier Transparent Resin Film

A gas barrier transparent resin film is a film having a constitution comprising a gas barrier layer layered on one side or each side of a base film.

Since it suffices that this transparent resin film has a constitution comprising a gas barrier layer layered on one side or on each side of a base film, another layer may be layered.

It is important for the gas barrier transparent resin film of the present surface protection panel to not have been stretched substantially, to be non-oriented, or to be uniaxially oriented. In other words, it is important that the gas barrier transparent resin film is not biaxially oriented, and has small optical anisotropy. That is to say, it is important for the gas barrier transparent resin film to have a smaller optical anisotropy than a same-composition gas barrier transparent resin film that has been biaxially stretched.

Thus, a desirable gas barrier transparent resin film is for instance one that has been formed by casting a raw material resin in solution state or monomer state by a solution casting method and then either not stretching or uniaxially stretching. In addition, forming a film of transparent resin plate with small optical anisotropy is also possible by pressing with metal belts, elastic rolls having a metal thin layer, or the like, in melt-extrusion molding.

In addition, for instance, when the film is molded by melt-extrusion molding as described above, sometimes it becomes oriented uniaxially even if no stretching treatment has been carried out.

When the gas barrier transparent resin film is uniaxially oriented, disposing the present surface protection panel so that the direction of the orientation axis thereof coincides with the direction of the orientation axis of the polarizer allows the appearance of rainbow colors within the display screen to be prevented and occurrence of shading depending on the viewing angle to be eliminated.

In addition, it suffices that the synthetic resin plate and the gas barrier transparent resin film are both non-oriented or uniaxially oriented. For instance, the synthetic resin plate may be non-oriented while the gas barrier transparent resin film is uniaxially oriented, and, the synthetic resin plate may be uniaxially oriented while the gas barrier transparent resin film is non-oriented. If both are uniaxially oriented, it is necessary to align the directions of both orientation axes.

For the retardation value of the gas barrier transparent resin film, 50 nm or less is desirable, and in particular 25 nm or less is more desirable. If the retardation value is adjusted to this range to make the optical anisotropy small, even when the gas barrier transparent resin film is uniaxially oriented, disposing the film in any orientation allows the appearance of rainbow colors within the display screen to be eliminated and occurrence of shading depending on the viewing angle to be prevented, with no need to align the direction of the orientation axis of the gas barrier transparent resin film with the direction of the orientation axis of the polarizer as described above.

The base film of a gas barrier transparent resin film is a film filling mainly the role of support body for the gas barrier layer, which material is not limited in particular. For instance, one species or two or more species of resin chosen from the group comprising polycarbonate series resins, alicyclic polyolefin series resins, styrene series resins, cellulose series resins, acrylic series resins, poly vinyl acetate series resins, polyvinyl butyral series resins and nylon series resins can be indicated as examples. Among them, cellulose series resins, and in particularly among them, triacetyl cellulose (TAC) are desirable from such points of view as optical isotropy, transparency and stiffness.

The thickness of the base film is not limited in particular if the thickness is such that the role of mechanical strength during film fabrication, wrinkling prevention during pressing, or the like, of the gas barrier layer, may be filled. In general, 10 μm to 188 μm and in particular 25 μm to 80 μm are desirable.

The gas barrier layer can be formed for instance from one species or two or more species of metal compound chosen from the group comprising silicon oxide, aluminum oxide, zinc oxide, indium tin oxide, silicon nitride and magnesium fluoride. Among these, silicon oxide and aluminum oxide are desirable as they allow transparent and dense membranes to be made inexpensively.

Although forming methods for the gas barrier layer are not limited in particular, for instance, physical vapor-deposition (PVD) method, chemical vapor-deposition (CVD) method, sputtering method, and the like, can be indicated preferably as examples.

While the thickness of the gas barrier layer is not limited in particular, it is 0.1 nm to 500 nm, preferably 0.5 nm to 100 nm and more preferably 1 nm to 50 nm. If thinner than this, obtaining a sufficient gas barrier property becomes difficult, and if too thick, cracks or detachments occur easily in the vapor-deposited film.

A primer layer may be provided between the base film and the gas barrier layer to improve the tight adhesion between the base film and the gas barrier layer.

As forming method for the primer layer (anchor coat layer), the method of coating the surface of the base film layer with a primer coat agent can be given.

For instance, as primer coat agents, solvent-soluble or water-soluble polyester resins, isocyanate resins, urethane resins, acrylic resins, vinyl alcohol resins, ethylene vinyl alcohol resins, vinyl-modified resins, epoxy resins, oxazoline group-containing resins, modified styrene resins, modified silicon resins, alkyl titanate, and the like, can be used alone or by combining two or more species.

Layering Method

While the gas barrier transparent resin film may be layered directly onto the transparent synthetic resin plate, it may also be layered through an adhesive layer.

As a method for layering a gas barrier transparent resin film directly onto the transparent synthetic resin plate, while not to be limited in particular, for instance, the method of directly laminating by heat-fusion, or the like, can be given.

Meanwhile, when layering is through an adhesive layer, for instance, the method of continuously bonding with a press roll, or the like, after an adhesive is coated can be given.

In so doing, as the adhesive, for instance, a dry laminating adhesive, a UV-curing adhesive, an epoxy series adhesive, a thermoplastic adhesive, and the like, can be given. Among them, an adhesive of the acrylic series, which is transparent and weather-resistant, and has high cohesive strength, is desirable.

A total light transmittance (JIS K 73610-1) for the adhesive of 85% or greater is desirable and in particular 88% or greater is desirable. In addition, the haze thereof (JIS K 7136) is preferably 3% or lower and in particular 1% or lower.

Other Constitutive Elements

Since it suffices that the present surface protection panel has a constitution comprising a transparent resin film layered on one side or on each side of a transparent synthetic resin plate, a layer other than these may be layered.

For instance, it is possible to adopt a constitution comprising a gas barrier transparent resin film layered on one of the sides of the transparent synthetic resin plate, and any one or more species among an anti-reflective layer, an anti-fouling layer and a hard coat layer layered on the other side.

Disposing an anti-reflective layer, an anti-fouling layer and a hard coat layer on the visible side allows the outdoor visibility of the image display device to be improved all the more.

Applications

The present surface protection panel allows liquid crystal image display devices to be constituted by adhering the gas barrier layer side thereof to a liquid crystal display panel through a pressure-sensitive adhesive layer. Among them, liquid crystal image display devices such as those used outdoors, for instance, liquid crystal image display devices provided with a liquid crystal display panel such as mobile phones, mobile gaming machines, mobile personal computers, mobile terminals, televisions and touch panels, can be constituted more adequately.

In so doing, while the adhesive layer can use various adhesives, a pressure-sensitive adhesive of the acrylic series, which is transparent and weather-resistant, and has high cohesive strength, is desirable.

As the acrylic pressure-sensitive adhesive, for instance, an adhesive comprising an adhesive composition containing a base polymer of the acrylic resin series, a crosslinking monomer, a crosslinking initiator, and as necessary other additives, is desirable.

Here, as base polymers, it is desirable to use (meth) acrylic acid ester series copolymers, and in particular a (meth) acrylic acid alkyl ester series copolymers.

As crosslinking monomers, it is desirable to use acrylic series crosslinking monomers. Among them, it is desirable to use monomers comprising, rather than monofunctional (meth) acrylates, multi-functional (meth) acrylates such as bifunctional (meth) acrylates, trifunctioal (meth) acrylates or tetrafunctional (meth) acrylates, or, multi-functional (meth) acrylates such as mixtures in which two or more species from monofunctional to tetrafunctional (meth) acrylates have been mixed.

As crosslinking initiators, it is desirable to use photo-initiators, and either of cleavage-type photo-initiators and hydrogen abstraction-type photo-initiators may be used alone, or both may be used in combination.

Explanation of Terms

In general, "sheet", by definition under JIS, refers to a product that is thin and flat, of which in general the thickness is small compared to the length and width; and in general, "film" refers to a thin and flat product, of which the thickness is extremely small compared to the length and width, the maximum thickness being arbitrarily limited, and provided normally in the form of a roll (Japanese Industrial Standard JIS K6900). For instance, speaking of thickness, there are occasions where those that are 100 μm or greater are referred to as sheets and those that are less than 100 μm are referred to as films, in a narrow sense. However, the boundary between a sheet and a film is not certain, and since there is no need in the present invention to discriminate the two in wording, in the present invention, "sheet" is deemed included even when referring to "film", and "film" is deemed included even when referring to "sheet".

In addition, while strictly speaking "Nenchakuzai (adhesive)" and "Secchakuzai (adhesive)" differ in the contents of the definitions of the two, since there is no need in the present invention to discriminate the two in wording from such point of view as there is no difference in the way an image looks if either is used as long as they are transparent, in the present invention, "Secchakuzai (adhesive)" is deemed included even when referring to "Nenchakuzai (adhesive)", and "Nenchakuzai (adhesive)" is deemed included even when referring to "Secchakuzai (adhesive)".

In the present invention, when expressed as "X to Y" (X and Y represent any numbers), unless expressly stated otherwise, along with the meaning of "X or greater but Y or less", the meaning of "preferably larger than X" or "preferably smaller than Y" also are deemed included.

In addition, in the present invention, when expressed as "X or greater" (X represents any numbers), unless expressly stated otherwise, the meaning of "preferably larger than X" is deemed included, and when expressed as "Y or less" (Y represents any numbers), unless expressly stated otherwise, the meaning of "preferably smaller than Y" is deemed included.

EXAMPLES

Examples will be described hereinafter; however, the present invention is not to be limited thereto.

Example 1

A 2 mm-thick×300 mm-wide×300 mm-long unstretched polycarbonate series resin plate (melt-extrusion molded, uniaxially oriented, product name "Stella S300" manufactured by Mitsubishi Plastics Industries Ltd.) was used as a transparent synthetic resin plate.

In addition, a film comprising an 80 μm-thick triacetyl cellulose (TAC) unstretched film (non-oriented) with aluminum oxide vacuum deposited on the front side and an acrylic adhesive (SK-Dyne 1882, manufactured by Soken Chemical & Engineering Co., Ltd.; proportion of curing agent added was the promoting mix ratio) coated on the back side and cured at room temperature after the solvent was volatilized, was used as a gas barrier transparent resin film.

In addition, a film (product name "ReaLook #8701UV-S", Manufactured by NOF Corporation) comprising an anti-staining- and anti-reflective-treated 80 μm-thick triacetyl cellulose (TAC) unstretched film (non-oriented) with an acrylic adhesive (SK-Dyne 1882, manufactured by Soken Chemical & Engineering Co., Ltd.; proportion of curing agent added was the promoting mix ratio) coated on the front side and cured at room temperature after the solvent was volatilized, was prepared as an anti-staining anti-reflective film.

The acrylic adhesive side of the gas barrier transparent resin film was layered on one side of the transparent synthetic resin plate and the acrylic adhesive side of the anti-staining, anti-reflective film was layered on the other side of the transparent synthetic resin plate to serve as a surface protection panel (sample).

In Table 1 "transparent film member" indicates a gas barrier transparent resin film.

Example 2

A 2 mm-thick×300 mm-wide×300 mm-long unstretched polycarbonate series resin plate (melt-extrusion molded, uniaxially oriented, product name "Stella S300" manufactured by Mitsubishi Plastics Industries Ltd.) was used as a transparent synthetic resin plate.

In addition, a polycarbonate resin raw material (CALIBRE 303-15, manufactured by Sumitomo-Dow) was nipped by the melt-extrusion method with a metal cast roll and an elastic roll having a metal film arranged on the surface, an 80 μm-thick sheet with small optical anisotropy was collected, aluminum oxide was vacuum-deposited on the front side thereof, an acrylic adhesive (SK-Dyne 1882, manufactured by Soken Chemical & Engineering Co., Ltd.; proportion of curing agent added was the promoting mix ratio) was applied on the back side, and the resulting unstretched film (non-oriented) was used as a gas barrier transparent resin film.

The acrylic adhesive side of the gas barrier transparent resin film was layered on one side of the transparent synthetic resin plate, the other side of the transparent synthetic resin plate was coated with an acrylic series hard coat (SEIKABEAM EXF001W, manufactured by Dainishiseika Color & Chemicals Mfg. Co., Ltd.) to a thickness of 5 μm and illuminated with UV light to serve as a surface protection panel (sample).

Example 3

A surface protection panel (sample) was produced in a similar manner to Example 1 except that a 0.8-thick×300 mm-wide×300 mm-long unstretched poly methyl methacrylate resin plate (a PMMA plate (non-oriented) molded by the cast method; product name "MR100" manufactured by Mitsubishi Rayon Co., Ltd.; retardation value <10 nm) was used as the transparent synthetic resin plate.

Comparative Example 1

A surface protection panel (sample) was produced according to Example 2 described in Japanese Patent Application Laid-open No. 2003-145658.

A 2 mm-thick×300 mm-wide×300 mm-long PMMA plate (unstretched, non-oriented, product name: Acrylite L001, manufactured by Mitsubishi Rayon Co., Ltd.) was used as a transparent synthetic resin plate.

In addition, a 12 μm-thick biaxially-stretched transparent vapor-deposited PET film (product name: Fine Barrier AT, manufactured by REIKO Co., Ltd.; draw ratio: 3×3-fold or greater) with aluminum oxide vapor-deposited on one side was used as a gas barrier transparent resin film.

The vapor-deposited aluminum oxide side of the biaxially-stretched transparent vapor-deposited PET film was coated with a dry-lamination-type adhesive, both sides of the PMMA plate was treated with a UV irradiation device (160 w/cm, 5 m/minute, height: 10 cm), and the biaxially-stretched transparent vapor-deposited PET film was layered on each side of the PMMA plate via a laminating roll. This was cured at 23° C.×50% RH for seven days to obtain a transparent gas barrier film-layered plate.

Next, with a 0.5 mm-thick soft acrylic pressure-sensitive adhesive sheet, a same-size 3 mm-thick float glass plate was joined to serve as a surface protection panel (sample).

The soft acrylic pressure-sensitive adhesive sheet used for joining was obtained by melt-stirring with respect to 100 parts by weight of acrylic acid ester copolymer, 0.5 parts by weight of acetylacetone zinc salt and 0.7 parts by weight of acetylacetone aluminum salt, which were then molded into sheet-form between release films.

Comparative Example 2

A surface protection panel (sample) was produced according to Example 1 described in Japanese Patent Application Laid-open No. 2007-152847.

Silicon oxide was vapor-deposited onto a 100 μm-thick stretched modified PET film (product: Softshine A1532, manufactured by Toyobo Co.; draw ratio: 3×3-fold or greater) so that the total light transmittance (JIS K 7361) was 90% to form a transparent water vapor barrier layer and produce a water vapor barrier transparent film.

Next, using a comma coater, an acrylic adhesive (SK-Dyne 1882, manufactured by Soken Chemical & Engineering Co., Ltd.; proportion of curing agent added was the promoting mix ratio) was coated onto the siliconized side of a release film (MRF38 manufactured by Mitsubishi Kagaku Polyester Co. Ltd.) and dried to form a 20 μm-thick pressure-sensitive adhesive layer, the non-vapor-deposited side of the water vapor barrier transparent film was superposed onto this pressure-sensitive adhesive layer and bonded by passing through press rollers. Thereafter, a protection film (622B, manufactured by Sekisui Chemical Co., Ltd.) was bonded onto the vapor-deposited side of the water vapor barrier transparent film, which was wound into a roll bundle to become a wound roll.

Next, inside a clean room, using an extruder and a pressure roller, a 2.0 mm-thick polycarbonate plate was extrusion-molded and conveyed on a manufacturing line, meanwhile, the water vapor barrier transparent film with pressure-sensitive adhesion produced as described above was fed from the wound roll, the pressure-sensitive adhesive layer was exposed while the release film was being peeled, and for the opposite side of the polycarbonate plate (unstretched, non-oriented), a protection film (624A, manufactured by Sekisui Chemical Co., Ltd.) was fed, the silicon oxide vapor-deposited film with pressure-sensitive adhesion and the protection film were passed through press rollers (linear pressure: 20 kg/cm) and bonded to the polycarbonate plate to obtain a surface protection panel (sample).

Tests and Evaluation

The results of image observation visualized through polarized glasses by disposing each surface protection panel (sample) produced in the examples and comparative examples described above to overlap with the display surface of a TFT liquid crystal display device (containing a polarizer) are shown in Table 1.

In so doing, the gas barrier film side of each surface protection panel (sample) was layered onto the display side of the TFT liquid crystal display device using a transparent UV-curing adhesive.

Regarding Examples 1 and 2, the surface protection panel (sample) was disposed in such a way that the direction of the orientation axis of the transparent synthetic resin plate coincided with the direction of the orientation axis of the polarizer within the TFT liquid crystal display device.

In addition, glasses having as lenses generic polarizers used in liquid crystal panels were used as polarized glasses.

Then, in the image observation, while the surface protection panel (sample) disposed on the display side of the liquid crystal display device was rotated so as to be parallel to the display side, the display side was viewed through the polarized glasses to observe the presence/absence of image discoloration.

In addition, the retardation values indicated in Table 1 were measured by the parallel nicols rotation method.

The evaluation was carried out with the following criteria:
["O" (circle)]: absence of image discoloration.
["X" (cross)]: presence of image discoloration.

TABLE 1

| | Transparent film substrate | Image observation |
|---|---|---|
| Example 1 | TAC | O |
| | Retardation value: <1 nm | |
| Example 2 | Non-stretched PC | O |
| | Retardation value: <25 nm | |
| Example 3 | TAC | O |
| | Retardation value: <1 nm | |
| Comparative Example 1 | Biaxially stretched PET Retardation value: >500 nm | X |
| Comparative Example 2 | Stretched modified PET Retardation value: >500 nm | X |

As is apparent from the results of Table 1, with a surface protection panel that used a biaxially-stretched transparent resin film, the image through the polarized glasses is discolored, and the image would not be viewed satisfactorily. In contrast, as in Examples 1 to 3, those that used a non-stretched film, the image could be viewed vividly with no discoloration.

Light emanating from a liquid crystal display screen is constituted by specific linearly polarized light. When the transparent resin plate or the gas barrier film layered onto the transparent resin plate is biaxially stretched, it is thought that the linearly polarized light is disturbed by the stretched axes, discoloring the image into rainbow colors during rotation of the polarized glasses, and viewing an appropriate image becomes impossible.

In contrast, when the transparent resin plate and the gas barrier film layered onto the transparent resin are unstretched or non-oriented, it is thought that the linearly polarized light is transmitted without being disturbed, and while the image is blocked at an angle that is perpendicular to the polarization axis of the polarized glasses, no image discoloration is observed elsewhere during the rotation.

In addition, it was found that, even for those in which the transparent resin plate or the gas barrier film was uniaxial stretched, by aligning the orientation axis thereof with the orientation axis of the polarizer of the liquid crystal display device, no image discoloration is observed.

The invention claimed is:
1. A surface protection panel, comprising:
a transparent synthetic resin plate; and
a gas barrier transparent resin film,
wherein
the gas barrier transparent resin film is positioned on one side or on each side of the transparent synthetic resin plate,
the gas barrier transparent resin film comprises a gas barrier layer and a base film,
the base film has a thickness of from 10 μm to 188 μm,
the base film comprises at least one of a polycarbonate resin, an alicyclic polyolefin resin, a styrene resin, a cellulose resin, an acrylic resin, a polyvinyl acetate resin, a polyvinyl butyral resin, and a nylon resin, the transparent synthetic resin plate has a thickness of from 0.3 mm to 5 mm, and the transparent synthetic resin plate and the gas barrier transparent resin film are not stretched.

2. The surface protection panel of claim 1, wherein the gas barrier transparent resin film has a retardation value of 50 nm or less.

3. The surface protection panel of claim 1, wherein the transparent synthetic resin plate comprises at least one of a polycarbonate resin, a PMMA resin, an alicyclic polyolefin resin, a styrene resin, a polyvinyl chloride resin, a phenol resin, a melamine resin, and an epoxy resin.

4. The surface protection panel of claim 3, wherein the transparent synthetic resin plate comprises a polycarbonate resin.

5. The surface protection panel of claim 1, wherein the transparent synthetic resin plate and the gas barrier transparent resin film are laminated via an adhesive layer.

6. The surface protection panel of claim 1, wherein the gas barrier layer comprises at least one of silicon oxide, aluminum oxide, zinc oxide, indium tin oxide, silicon nitride, and magnesium fluoride.

7. The surface protection panel of claim 1,
wherein the gas barrier transparent resin film is laminated on one side of the transparent synthetic resin plate, and
at least one of an anti-reflective layer, an anti-fouling layer, and a hard coat layer is laminated on the other side of the transparent synthetic resin plate.

8. The surface protection panel of claim 7, wherein the gas barrier layer comprises at least one of silicon oxide and aluminum oxide.

9. A liquid crystal image display device, comprising:
a liquid crystal display panel; and
the surface protection panel of claim 1,
wherein, in the surface protection panel of claim 1, the gas barrier transparent resin film is positioned on one side of the transparent synthetic resin plate, and
the gas barrier transparent resin film is adhered to the liquid crystal display panel through an adhesive layer.

10. The liquid crystal image display device of claim 9, wherein the gas barrier layer of the gas barrier transparent resin film is adhered to the liquid crystal display panel through the adhesive layer.

11. The liquid crystal image display device of claim 9,
wherein the surface protection panel is disposed on a visible side of the liquid crystal display panel.

12. A liquid crystal display panel, comprising:
the surface protection panel of claim 1 disposed on a visible side of the liquid crystal display panel,
wherein, in the surface protection panel of claim 1, the gas barrier transparent resin film is positioned on one side of the transparent synthetic resin plate, and
the gas barrier transparent resin film is adhered to the liquid crystal display panel through an adhesive layer.

13. The liquid crystal display panel of claim 12, wherein the gas barrier layer of the gas barrier transparent resin film is adhered to the liquid crystal display panel through the adhesive layer.

14. The surface protection panel of claim 1, wherein the transparent synthetic resin plate has a retardation value of 50 nm or less.

15. The surface protection panel of claim 1, wherein the transparent synthetic resin plate has a retardation value of 25 nm or less.

16. The surface protection panel of claim 1, wherein the transparent synthetic resin plate has a thickness of from 0.5 to 3 mm.

17. The surface protection panel of claim 1, wherein the gas barrier transparent resin film has a retardation value of 25 nm or less.

18. The surface protection panel of claim 1, wherein the base film of the gas barrier transparent resin film comprises a cellulose resin.

19. The surface protection panel of claim 18, wherein the cellulose resin is triacetyl cellulose (TAC).

20. A surface protection panel, comprising:
a transparent synthetic resin plate; and
a gas barrier transparent resin film,
wherein
the gas barrier transparent resin film is positioned on one side or on each side of the transparent synthetic resin plate,
the gas barrier transparent resin film comprises a gas barrier layer and a base film,
the base film has a thickness of from 10 μm to 188 μm,
the base film comprises at least one of a polycarbonate resin, an alicyclic polyolefin resin, a styrene resin, a cellulose resin, an acrylic resin, a polyvinyl acetate resin, a polyvinyl butyral resin, and a nylon resin,
the transparent synthetic resin plate has a thickness of from 0.3 mm to 5 mm, and
the transparent synthetic resin plate and the gas barrier transparent resin film are non-oriented or uniaxially oriented.

* * * * *